United States Patent [19]

McMullin

[11] Patent Number: 4,963,741

[45] Date of Patent: Oct. 16, 1990

[54] LARGE AREA PYROELECTRIC JOULEMETER

[75] Inventor: John C. McMullin, San Jose, Calif.

[73] Assignee: Molectron Detector, Inc., Portland, Oreg.

[21] Appl. No.: 65,225

[22] Filed: Jun. 22, 1987

[51] Int. Cl.$^5$ .............................................. G01J 1/00
[52] U.S. Cl. ............................ 250/338.3; 250/338.1; 250/340
[58] Field of Search ............. 250/338 PY, 338 R, 340

[56] References Cited

U.S. PATENT DOCUMENTS

| | | | |
|---|---|---|---|
| Re. 29,082 | 12/1976 | Schwarz | 250/342 |
| 3,571,592 | 3/1971 | Glass | 250/338 R |
| 3,581,092 | 5/1971 | Pearsall et al. | 250/338 R |
| 3,654,466 | 4/1972 | Abrams et al. | 250/338 R |
| 3,813,550 | 5/1974 | Abrams et al. | 250/338 R |
| 3,839,640 | 10/1974 | Rossin | 250/353 |
| 3,887,471 | 6/1975 | Stotlar | 250/340 |
| 3,932,753 | 1/1976 | Stotlar | 250/332 |
| 3,975,632 | 8/1976 | Glass et al. | 250/212 |
| 4,044,251 | 8/1977 | Taylor et al. | 250/338 PY |
| 4,072,863 | 2/1978 | Roundy | 250/332 |
| 4,130,694 | 12/1978 | Glass et al. | 429/193 |
| 4,172,663 | 10/1979 | Byer et al. | 356/352 |
| 4,218,620 | 8/1980 | Oettel | 250/338 PY |
| 4,297,704 | 10/1981 | Marom et al. | 343/113 R |
| 4,326,663 | 4/1982 | Oettel | 228/123 |
| 4,367,408 | 1/1983 | Imai et al. | 250/338 PY |
| 4,384,207 | 5/1983 | Doctor | 250/349 |
| 4,425,504 | 1/1984 | Turnbull et al. | 250/338 PY |
| 4,437,003 | 3/1984 | Doctor | 250/342 |
| 4,441,023 | 4/1984 | Doctor | 250/338 PY |
| 4,485,305 | 11/1984 | Kuwano et al. | 250/338 R |
| 4,682,030 | 7/1987 | Rose et al. | 250/338 PY |

FOREIGN PATENT DOCUMENTS 0069524 4/1985 Japan ........................... 250/338 PY

OTHER PUBLICATIONS

"Molectron J3 Pyroelectric Joulemeter" brochure by Cooper LaserSonics, Inc., Santa Clara, Calif.

Primary Examiner—Constantine Hannaher
Assistant Examiner—J. Eisenberg

[57] ABSTRACT

A large area pyroelectric joulemeter for measuring the pulsed beam output of a laser. The joulemeter employs a pyroelectric detector element with front and rear conductive surfaces forming electrodes, a relatively massive mounting block with relatively high thermal conductivity and an epoxy adhesive for securing the detector element to the mounting block, the epoxy having relatively high thermal conductivity so that heat can be quickly dissipated out of the detector element. An internal recess in the mounting block accommodates a trimming capacitor and resistor for adjusting the voltage sensitivity of the detector assembly to a constant value. The detector assembly is removably installed within an outer housing having a main base portion and a removable bezel.

15 Claims, 1 Drawing Sheet

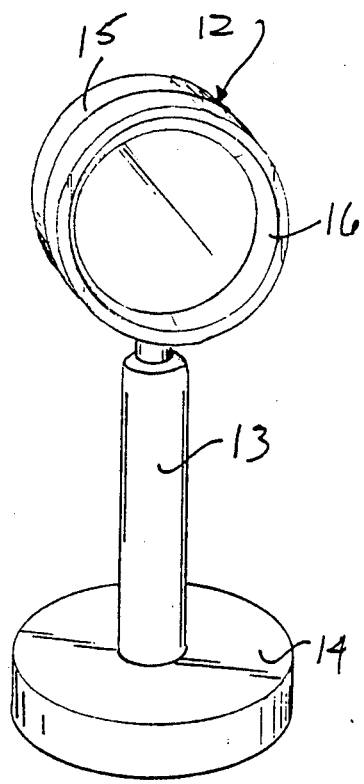
FIG._1.
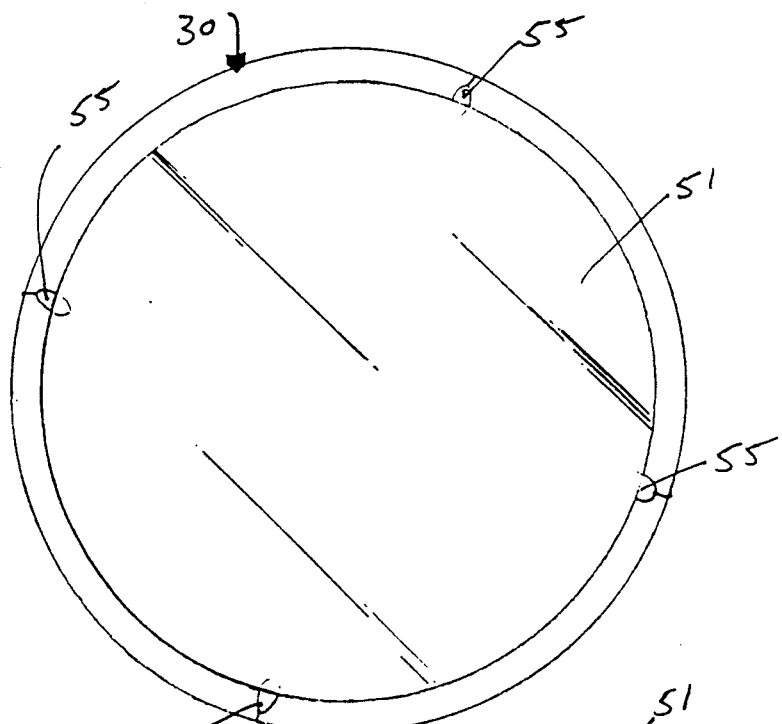
FIG._3.
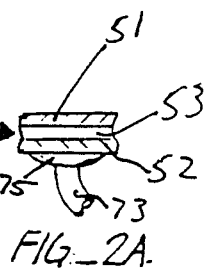
FIG._2A.
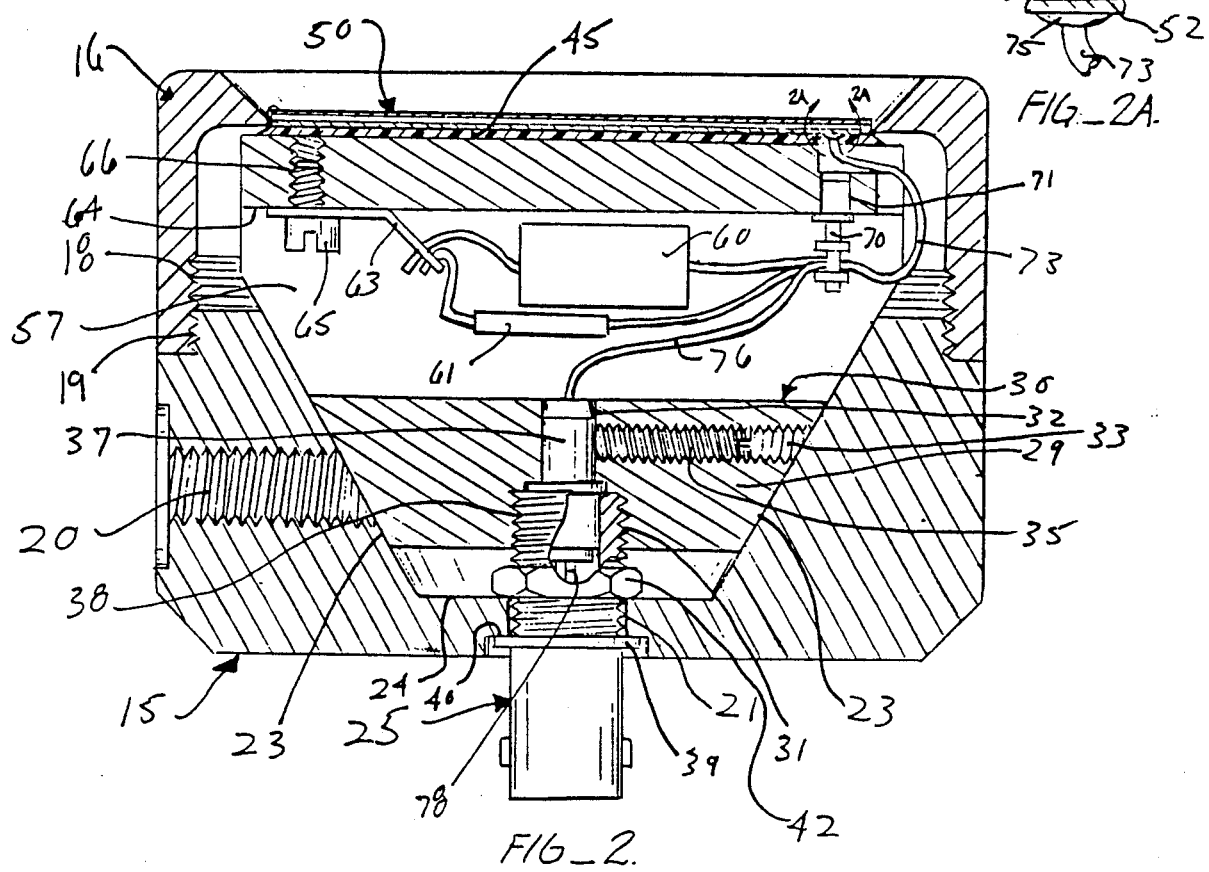
FIG._2.

LARGE AREA PYROELECTRIC JOULEMETER

BACKGROUND OF THE INVENTION

This invention relates to pulsed energy detectors useful in the spectral range from ultraviolet to far infrared. More particularly, this invention relates to pyroelectric joulemeters used to measure and calibrate the output of pulsed energy devices.

Pyroelectric joulemeters are known which are used to measure the energy output of pulsed lasers. A typical pyroelectric joulemeter includes a thin rectangular or circular pyroelectric detector wafer provided with front and rear surface electrodes for manifesting electrical signals generated by the pyroelectric effect when the detector wafer is subjected to pulsed incident radiation. Typical pyroelectric materials known in the art are lithium niobate, barium strontium niobate, lithium tantalate, lead zirconate titanate (PZT). lantham-doped lead zirconate titanate, thalium arsenic selenide, and polyvinylidene fluoride (PVDF) The detector element is normally mounted within a protective housing, with one face of the detector exposed to ambient, either directly or through a protective window plate. An example of a known prior art pyroelectro detector is shown in U.S. Pat. No. 3,571,592, Pyroelectric joulemeters may be generally classified as small area detectors and large area detectors. The small area detectors, which typically employ a pyroelectric detector wafer having a diameter in the range from about 2 to 10 mm., are especially suited for use in measuring and calibrating the pulse energy output of lasers having energies in the microjoule to millijoule range. Such small area devices typically require an electronic amplifier incorporated into the detector device due to the small detector internal capacitance, which is typically less than the capacitance of the cable used to connect the detector to a measuring instrument, typically an oscilloscope. The requirement for an amplifier adds cost to the device. manufacturing complexity, and introduces electronic noise into the pyroelectric signal generated by the detector, all of which are disadvantageous. In addition, small area detectors having an internal amplifier typically require a special termination element in order to match the input impedance of the measuring instrument.

Large area detectors are designed for use with pulsed lasers having energies in the millijoules to joules range and, as suggested by the name, use a pyroelectric detector wafer which is much larger in area than the small area detectors and typically has a diameter in the range from about 25 to 50 mm. Some commercially available large area detectors use a built in preamplifier, with the same attendant disadvantages as those noted above for the small area detectors. Other commercially available large area detectors do not employ an internal amplifier, but suffer from several disadvantages, such as poor sensitivity. microphonic noise generation (due to the piezoelectric effect inherent in pyroelectric materials) and relatively poor heat dissipation, which can lead to premature failure of the detector element. In addition, known large area detectors suffer from a relatively low maximum repetition rate, typically about 2 pulses per second for a detector with a 50 mm pyroelectric detector element. This relatively low maximum repetition rate limits the usefulness of such devices in measuring and calibrating pulsed laser outputs and is due primarily to the relatively high dielectric coefficient of the pyroelectric material used in some commercially available detectors and the thermal characteristics of the detector element and any coatings applied thereto. Another disadvantage with known large area detectors is the relatively high sensitivity of the pyroelectric coefficient to temperature changes. For PZT this sensitivity factor is 1.2% per degree Kelvin, while for PVDF this factor is 0.5% per degree Kelvin. Since the detector element can be subjected to wide temperature swings at a relatively fast rate, the pyroelectric coefficient can also vary widely with temperature changes, which adversely affects the output signal from the device.

In addition, most large area pyroelectric joulemeters employ a sealed unit construction, which requires transport of the entire joulemeter to the manufacturer for repair. As a consequence, the user is virtually forced to purchase two complete units—a main unit and a backup unit—to maintain constant joulemeter measurement and calibration capability. Still further, the voltage responsivity, measured in volts per joule,of known large area detectors can vary from unit to unit, which is undesirable.

Efforts to date to design a large area pyroelectric joulemeter devoid of the above-noted disadvantages have not met with success to date.

SUMMARY OF THE INVENTION

The invention comprises a large area pyroelectric joulemeter which exhibits excellent electrical and physical characteristics, which is optimally designed for use with pulsed lasers with energies in the millijoules to joules range, which has a replaceable detector element assembly, which can be configured as either a reflective or absorbant detector, and which is devoid of the disadvantages noted above with known large area devices.

In the preferred embodiment, the invention comprises a housing having a main portion and an apertured bezel portion; and a pyroelectric detector assembly removably mounted to the main portion of the housing. The detector assembly includes an electrically conductive mounting block having a frusto-conical base portion which is removably received within a mating internal frusto-conical recess formed in the main portion of the housing. The assembly further includes a pyroelectric detector element, preferably comprising a lithium niobate Z-cut crystal wafer provided with front and rear electrically conductive electrodes. The front electrode is electrically coupled to the electrically conductive mounting block by means of a plurality of electrically conductive adhesive regions spaced about the periphery of the pyroelectric wafer. The rear electrically conductive face is bonded to a surface of the mounting block by an electrically insulative adhesive.

The mounting block has a centrally located threaded aperture extending through the frusto-conical base portion, and a threaded bore extending substantially normal to the central aperture. An output connector, which is electrically coupled to the front and rear conductive faces of the detector element, has an externally threaded portion received within the threaded aperture in the mounting block base portion and is secured therein by means of a screw received within the threaded bore and bearing against the side surface of the output connector. The main housing portion also has an aperture located in alignment with the threaded aperture in the mounting block, and part of the threaded portion of the output connector is secured within the main housing portion aperture, so that the output connector removably secures the mounting block to the main housing portion.

The mounting block and the electrically insulative adhesive have closely matched coefficients of thermal expansion, which are larger than the coefficient of thermal expansion of the detector element. During fabrication. both the electrically insulative and the electrically conductive adhesives are thermally cured by raising the temperature of the developing detector assembly, including the mounting block, the two adhesives, and the detector element, to the curing temperature of the adhesives, holding the developing assembly at this temperature for a curing period. and cooling the developing assembly down to room temperature. Due to the different co-efficients of thermal expansion, during heating the block and electrically insulative adhesive expand more than the detector element; correspondingly. during cooling the mounting block and the electrically insulative adhesive contract more than the detector element. As a result, in the finished detector assembly the detector element is compressed. Since the detector element material is less sensitive to fracture when under compression, the resulting detector assembly is less sensitive to physical damage.

The mounting block is provided with a transverse internal recess for accommodating a capacitor and resistor used to adjust the voltage responsivity of the detector assembly, so that each detector assembly has the same voltage responsivity. Consequently. the detector assemblies are not only physically but also electrically interchangeable in the housing, so that only the detector assembly itself need be sent to the manufacturer for replacement or repair.

Due to the careful matching of the pyroelectric properties of the detector element material (small dielectric constant, low pyroelectric coefficient sensitivity with temperature change. and high thermal conductivity) with the thermal and mechanical properties of the mounting block and non-conductive adhesive (relatively stable mass for the mounting block and high thermal conductivity for both). the invention affords an extremely high repetition rate (up to 400 pulses per second), thermal stability, low microphonic noise and relatively fast thermal response. In addition, by the use of an optimal thin coating of black paint the detector may be changed from unique reflective version to a nearly 100% absorptive version for direct beam measurement.

For a further understanding of the nature and advantages of the invention, reference should be had to the ensuing detailed description, taken in conjunction with the accompanying drawings.

BRIEF DESCRIPTION OF THE DRAWINGS view of a pyroelectric

FIG. 1 is a perspective joulemeter incorporating the invention:

FIG. 2 is a transverse sectional view showing the internal structure of the preferred embodiment;

FIG. 2A is an enlarged detail view showing the electrical connection to the inner electrode face of the detector element: and FIG. 3 is a top plan view showing the detector element face and exposed top surface of the mounting block.

DESCRIPTION OF THE PREFERRED EMBODIMENT

Turning now to the drawings. FIG. 1 illustrates in perspective view a joulemeter incorporating the preferred embodiment of the invention. As seen in this FIG. a joulemeter generally designated with reference numeral 12 is mounted on a post 13 secured to a base 14. Joulemeter 12 comprises a housing having a main portion 15 and an apertured bezel portion 16 for exposing the detector element described below to incident radiation during use. As best shown in FIG. 2, bezel 16 has an internally threaded portion 18 which is threadably received on an externally threaded portion 19 of the main housing portion 15. Main housing portion 15 is provided with a transverse threaded aperture 20 which receives the threaded upper portion (not illustrated) of post 13 in order to removably secure the joulemeter 12 to the post 13. Main housing portion 15 is also provided with a centrally located aperture 21 for mounting an output connector 25 in the manner described below.

Base housing portion 15 is a relatively massive block preferably fabricated from type 6061-T6 aluminum and having a frusto-conical internal recess formed by sloped side walls 23 and internal base wall 24. This frusto-conical recess is sized to receive the frustoconical base portion 29 of a detector mounting block 30, which is fabricated from a highly mechanically stable material with relatively high thermal conductivity. preferably Alpase K-100 cast aluminum available from Alpase Company of Downey. Calif. Mounting block 30 has a central aperture with an enlarged internally threaded portion 31 and a reduced smooth walled portion 32. A laterally arranged threaded passage 33 opens into the smooth walled portion 32 of this throughbore, and a set screw 35 is threadably received in passage 33.

Output connector 25 has an internal smooth walled portion 37 which is received in smooth walled portion 32 of the mounting block throughbore and is secured by means of set screw 35. Connector 25 has an externally threaded portion 38, the upper part of which is threadably engaged in internally threaded portion 31 of the mounting block throughbore. An outer part of threaded portion 38 of connector 25 is received in smooth walled aperture 21 formed in the housing base portion, and connector 25 is further provided with an enlarged flange portion 39 which bears against a stepped shoulder 40. A nut 42 secures connector 25 to the base housing portion 15. As will now be apparent, the mounting block 30 is secured within the base housing portion by means of the connector 25, which also functions as the output connector for the signals generated by the detector element described below.

Secured to the upper face of the mounting block 30 by means of an electrically insulative adhesive layer 45 is a detector element 50. As best seen in FIG. 2A, detector element 50 comprises an electrically conductive front face 51, an electrically conductive rear face 52 and an intermediate pyroelectric wafer 53. Pyroelectric wafer 53 is preferably formed from lithium niobate having a pyroelectric coefficient of 0.0083 microcoulombs per square cm. ° K. a relative dielectric constant of value 28, a pyroelectric coefficient sensitivity of 0.2/° K, a curie temperature of 1.150° C. a heat capacity of 0.635 joule per gm. ° K. a thermal conductivity of 4.18 watt per M ° K. a coefficient of thermal expansion of $15.5 \times 10^6$ a density of 4.64 gm per cubic centimeter, a dissipation factor of 0001 at 1 Khz, and is a Z-cut crystal 380 microns thick. The diameter of layer 53 is preferably either 26.7 millimeters or 52.1 millimeters, providing a detector area of 5.6 square centimeters and 21.3 square centimeters. respectively.

Electrically insulative adhesive 45 is preferably an epoxy based Wakefield 152-1-A adhesive available from Wakefield Engineering of Wakefield, Mass. Front conductive face 51 is preferably a layer of vacuum deposited chromium having a resistivity of 280 Ohms per square. Rear conductive face 52 is preferably a two stage layer of vacuum deposited chromium with a resistivity of 500 Ohms per square and an overlay of vacuum deposited gold having a resistivity less than 5 Ohms per square.

As best shown in FIG. 3, front electrically conductive face 51 is electrically connected to the mounting block 30 by means of four electrically conductive adhesive regions 55. These regions are preferably formed from EPO-TEK type H-20E epoxy available from EPO-TEK of Billerica, Mass.

Extending transversely of mounting block 30 is an internal recess 57 sized to accommodate a pair of electrical components, viz., a capacitor 60 and a resistor 61. One terminal each of capacitor 60 and resistor 61 is connected to a ground lug 63 which is secured to the upper inner surface 64 of mounting block 30 by means of a screw 65 threadably engaged in a threaded recess 66. The other lead from capacitor 60 and resistor 61 is connected to an insulated stand-off 70 press fitted into a small aperture 71 formed in the upper surface of mounting block 30. The conductive portion of insulated stand-off 70 is electrically connected to rear conductive face 52 by means of a small wire 73 and an electrically conductive epoxy adhesive bead 75 (FIG. 2A). The electrically conductive portion of insulated stand-off 70 is also connected by means of a small wire 76 to the center terminal 78 of output connector 25. As will be appreciated, the front face 51 of the detector element 50 is electrically coupled to the shield portion of output connector 25 through the four electrically conductive adhesive regions 55, the apertured bezel portion 16 and the main housing portion 15.

To fabricate the preferred embodiment, after, vacuum deposition of the front and rear faces 51, 52 on the pyroelectric element 53, wire 73 is attached to rear face 52 by the conductive epoxy 75, after which the epoxy is baked and cured. Separately, the ground lug 63 is installed with mounting screw 65 and the insulated stand-off 70 is inserted into the aperture 71. Next, the epoxy adhesive layer 45 is placed on the upper surface of mounting block 30, and the detector element 50 is placed over the uncured layer 45. Next, the four conductive adhesive regions 55 are applied, after which the developing assembly is placed in an oven and heat cured at 90° C. for approximately four hours and then permitted to cool.

After the developing assembly has cooled, conductive wire 76 is installed. The output connector 25 is then installed in the base housing portion 15 and the mounting block 30, after which the bezel portion 16 is attached. Calibration is then performed using a pulsed nitrogen laser with a four millijoules power output set to a pulsed repetition rate of 10 pulses per second. With a pulse laser beam directed against the base of the detector, the output signals are observed to determine the voltage sensitivity of the unit. Fixed capacitances are inserted sequentially until the predetermined voltage responsivity of eight volts per joule is achieved. A fixed capacitor 60 of the matching capacitance is then installed between ground lug 63 and stand-off 70, along with a resistor 61 selected to achieve the desired time constant of 450 microseconds.

The above-described embodiment is designed for use as a reflective pyroelectric joulemeter which is employed by placing the unit so that the face of the detector element 50 is arranged at an angle with respect to the pulsed laser beam to be measured. This embodiment enjoys the highest repetition rate capability of up to 400 pulses per second. In some applications it may be desirable to use a joulemeter capable of direct beam measurement, which is employed by placing the face of the detector element essentially normal to the pulsed beam to be measured. The invention can be simply modified to function as a direct beam joulemeter by providing a relatively thin coating to front face 51 of the detector element 50. The paint, which is substantially 100% absorbing black paint, introduces a thermal capacitance to the detector element. As a result, the maximum pulse repetition rate for the direct beam embodiment is reduced to 10 pulses per second. Nevertheless, this is substantially higher than the maximum pulse repetition rate of known devices. In the preferred embodiment, the black paint employed for the direct beam embodiment is a type ECP 2200 paint available from 3M Corporation, and is sprayed onto a thickness of about six grams per square meter using a standard air brush apparatus.

As will now be apparent, the invention affords a large area pyroelectric joulemeter capable of either direct or reflected beam measurement which has a relatively high repetition rate, relatively high thermal stability, low microphonic noise generation and relatively rapid dissipation of heat away from the detector element 50 via the thin electrically insulative, thermally conductive epoxy layer 45 and thermally efficient, massive mounting block 30. In addition, the entire apparatus is relatively simple to construct and maintain. In addition, when repair (such as replenishment of the black coating on the detector element 50) is required, the inner assembly may be readily removed by unscrewing the bezel portion 16, unscrewing the inner assembly from the threaded outer portion of connector 25, and returning the inner assembly to the factory.

While the above provides a complete and adequate description of the preferred embodiment of the invention, various modifications, alternate constructions and equivalents will occur to those skilled in the art. Therefore, the above should not be construed as limiting the invention, which is defined by the appended claims.

What is claimed is:

1. A pyroelectric joulemeter comprising:
a housing having a main portion and an apertured bezel portion;
a pyroelectric detector assembly mounted in said housing, said detector assembly comprising an electrically and thermally conductive mounting block removably secured to said main portion of said housing, and a pyroelectric detector element, said detector element having a first electrically conductive face secured to a face of said mounting block and electrically isolated therefrom by a thermally conductive, electrically insulative adhesive and a second electrically conductive face exposed to ambient via said apertured bezel, said second electrically conductive face being electrically coupled to said mounting block; and an output connector electrically coupled to said detector element for supplying signals therefrom.

2. The invention of claim 1 wherein said housing has an internal frusto-conical recess, and wherein said mounting block has a mating frusto-conical base portion received within said recess.

3. The invention of claim 1 wherein said adhesive is an epoxy resin.

4. The invention of claim 1 wherein said second electrically conductive face of said detector element is electrically coupled to said mounting block by an electrically conductive adhesive.

5. The invention of claim 4 wherein said adhesive is an epoxy resin.

6. The invention of claim 1 wherein said mounting block has a threaded aperture; and wherein said output connector has an externally threaded portion received within said threaded aperture.

7. The invention of claim 6 wherein said main housing portion has an aperture located in alignment with said threaded aperture in said mounting block; and wherein part of said threaded portion of said output connector is secured within said main housing portion aperture, so that said output connector secures said mounting block to said main housing portion.

8. The invention of claim 6 wherein said mounting block has a threaded bore extending substantially normal to said threaded aperture; and wherein said output connector is secured to aid mounting block by a screw received within said threaded bore and bearing against a side surface of said output connector.

9. The invention of claim 1 wherein said detector element includes a crystal of lithium niobate.

10. The invention of claim 9 wherein said crystal in Z-cut.

11. The invention of claim 1 wherein said mounting block has an internal recess for accommodating at least one electrical component.

12. A large area pyroelectric joulemeter comprising:
a mechanically stable, low coefficient of expansion mounting block of high thermal conductivity having a mounting surface;
a large area, 25 mm diameter or greater, pyroelectric detector element having front and rear conductive electrode faces and intermediate layer of pyroelectric material; and
a thin, continuous layer of a thermal compound, having high thermal conductivity to mount and heat sink said detector element, promoting thermal dissipation from said pyroelectric detector element to said mounting block to provide thermal stability and higher laser damage threshold to said pyroelectric joulemeter; and
same thin, continuous layer of thermal compound, being electrically non-conducting providing total electrical isolation of the backside detector electrode 52 from mounting block therefore allowing electrical isolation of voltage and lead from system ground; and
a front detector electrode 51 which is grounded to mounting block with use of several dots of electrically conductive adhesive, thus providing considerable EMI shielding for large area joulemeter.

13. The invention of claim 12 wherein said pyroelectric material has a low dielectric coefficient and therefore allows the fabrication of a Joulemeter with lower capacitance, yielding a higher voltage output and a shorter electrical time constant.

14. The invention of claim 12 wherein said pyroelectric joulemeter material has a low piezoelectric coefficient to minimize microphonic response.

15. The invention of claim 14 wherein said pyroelectric joulemeter material has a high Curie temperature and whose Pyroelectric temperature coefficient is very low, thus yielding a very stable voltage output vs. temperature.

* * * * *